United States Patent
Walser

[11] 3,866,324
[45] Feb. 18, 1975

[54] DENTAL FORCEPS

[76] Inventor: Julius Walser, Teggingerstrasse 14a, 776 Radolfzell, Germany

[22] Filed: Nov. 19, 1973

[21] Appl. No.: 416,859

[30] Foreign Application Priority Data
Nov. 22, 1972 Germany............................ 2257156

[52] U.S. Cl. .................................................. 32/66
[51] Int. Cl. .............................................. A61c 3/14
[58] Field of Search............................ 32/61, 62, 66

[56] References Cited
UNITED STATES PATENTS
2,140,280  12/1938  Buskirk................................... 32/62
2,592,641   4/1952  Balderstone........................... 32/62

*Primary Examiner*—Robert Peshock
*Attorney, Agent, or Firm*—Hill, Gross, Simpson, Van santen, Steadman, Chiara & Simpson

[57] ABSTRACT

Forceps for the extraction of teeth are provided with swivelly mounted jaws automatically compensating for variations in tooth shapes to distribute the gripping load along the side walls of the tooth and thereby minimize the danger of crushing or fracturing the tooth. The forceps have pivoted handles with angled arms beyond the pivot providing sockets rotatably receiving jaws with engaging tips on an axis of rotation so that when the tips engage the sides of a tooth to be extracted, the jaws will rotate about the axis to grip the tooth along extended lines distributing the gripping load to avoid crushing. Torsion springs rotate the jaws to bring the tips thereof into contact and rotation of the jaws is limited and the springs return the jaws to a starting position with their tips in engagement.

14 Claims, 14 Drawing Figures

PATENTED FEB 18 1975

DENTAL FORCEPS

BACKGROUND OF THE INVENTION

1. Field of the Invention

This invention relates to the art of the extraction of teeth with forceps having jaws which automatically swivel into desired gripping engagement with the sides of a tooth to be extracted. Specifically, the invention deals with dental forceps having pivoted handles which manipulate arms that carry swivelly mounted jaws automatically rotating about axes which will align the gripping noses with the sides of the tooth to be extracted.

Heretofore dental forceps have been made in a great number of different embodiments aiming toward conforming the jaws to the curvature and taper of the average shape of a tooth. Many different sizes and shapes of forceps were thus required for dental extraction. However, in spite of the multiple assortment of forceps heretofore provided, it remains a matter of chance that the selected forceps will correspond exactly to the shape of the tooth to be extracted. If, for example, the forceps' mouth is too conical to conform with the crown of the tooth to be extracted, the tooth will be grasped solely in a narrow cross sectional zone on the fleshy edge of the tooth, the forceps will act as a pair of pliers and fracture and crushing of the tooth due to high unit loading will easily occur. Danger of fracture or crushing is greatly increased where the crown of the tooth is weakened by fillings and cavities.

Since teeth are generally incompressible and quite brittle especially in the area of the enamel glaze thereon, any slight deviations in the conicity of the sides of the tooth from the gripping shape of the extracting forceps will present a very dangerous condition leading toward frequent cracking, crushing and fracturing of the tooth.

The present invention now provides a tooth forceps that does not have the disadvantages of the previously known forceps. The dental forceps of this invention provides jaws which are automatically adjusted to the shape of the tooth to be extracted, thereby avoiding the heretofore requirement of a large number of different sizes and shapes of forceps to accommodate the average tooth. The adjustable jaws of the forceps of this invention distribute the load along the sides of the tooth to minimize high unit loading.

It is then an object of this invention to provide a dental forceps for the extraction of teeth with swivelly mounted jaws which will automatically follow the contour of the tooth to be extracted.

Another object of the invention is to provide a forceps with rotatable jaws which will automatically adapt to the different conical contours of teeth and the like to be extracted by the forceps.

A further object of the invention is to provide a tooth forceps having pivoted handles, arms manipulated by the handles, and angled jaws swivelly mounted on the arms and having torsion springs rotating the jaws to bring their tip ends into contact with each other.

Another object of the invention is to provide a tooth forceps with angled jaws rotatable about an axis extending through the tip ends of the jaws.

A specific object of the invention is to provide a tooth forceps with a pair of handle grips pivoted on a pin and manipulating arms beyond the pin which swivelly mount angled jaws having toothgripping noses brought into contact by torsion springs and rotating against the action of the springs into conformity with the tooth surfaces being gripped for extraction of the tooth.

Other and further objects of this invention will become apparent to those skilled in this art from the following detailed description of the annexed sheets of drawings which show preferred embodiments of the invention.

IN THE DRAWINGS

AS SHOWN IN THE DRAWINGS

Figure 1:
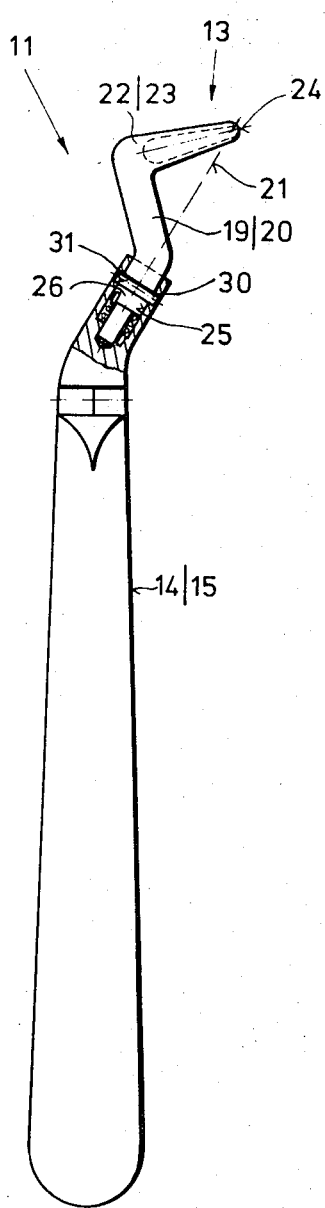
FIG. 1 is a side elevational view, with parts broken away and shown in longitudinal section, of a tooth forceps of this invention for the extraction of teeth in the lower jaw.
Figure 2:
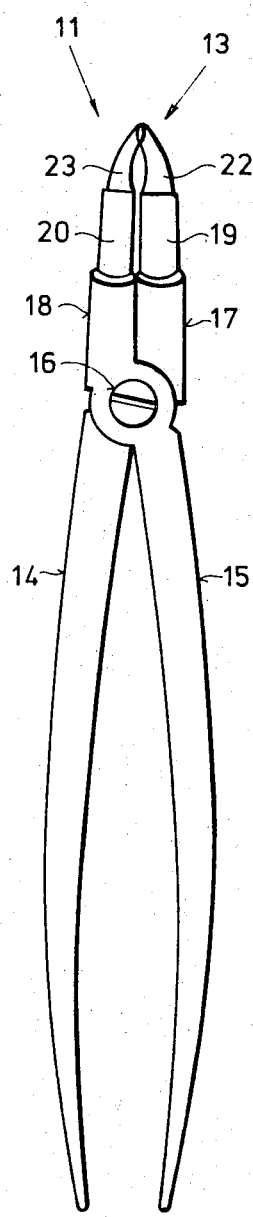
FIG. 2 is a plan view of the tooth forceps of FIG. 1.
Figure 3:
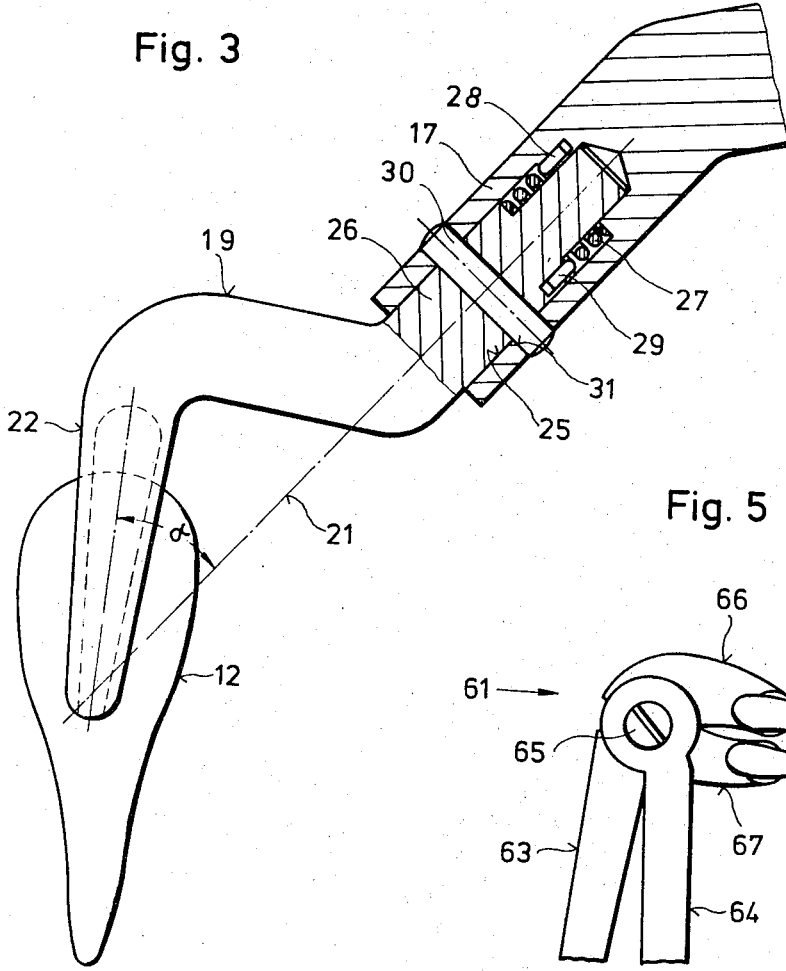
FIG. 3 is an enlarged side elevational view, with parts in longitudinal section, of the jaw end of the forceps of FIGS. 1 and 2 illustrating the manner in which a jaw grips a tooth to be extracted.

As shown in FIGS. 1 and 3, the tooth forceps 11 for the extraction of a tooth 12 in the lower jaw has a tooth gripping mouth 13, a pair of grips or handles 14 and 15 pivoted on a pin 16 with crossover arm ends 17 and 18 swivelly mounting angled mouth defining jaws 19 and 20 which project from the ends of the arms. The arms 17 and 18 are angled relative to the handles 14 and 15 and the jaws 19 and 20 projecting from these arms are generally S-shaped with leg portions angled backwardly from the arms as shown in FIG. 1 and then projecting forwardly. The jaws rotate on axes 21 which are about 45° from the longitudinal axes of the handles 14 and 15. The jaws 19 and 20 have front ends or tooth encircling noses 22 and 23, respectively, which have tips 24 in engagement in the closed position of the forceps as shown in FIG. 2.

The arms 17 and 18 have recesses or bores 25 extending inwardly from the ends therof receiving cylindrical pin ends 26 of the jaws 19 and 20. A torsion spring 27 has an end 28 anchored in a hole in the bottom of the recess 25 and an opposite end 29 anchored in a hole in the pin end 26 of each jaw 19 or 20 and is effective to rotate the jaws so that their tips 24 will contact each other as shown in FIG. 2. A diametral pin 30 extends through the pin end 26 of each jaw 19 and 20 into elongated slots 31 in the hollow ends of the arms 17 and 18. These grooves limit the rotary movement of the jaws 19 and 20 and are so positioned relative to the pin 30 that the torsion spring rotates the jaw to seat the opposite ends of the pin against opposite ends of the grooves and positions the jaw nose at an angle of about 5 degrees relative to the opposite jaw nose while rotation of the jaw to move the pin to the middle of the grooves will position the noses of the jaw in parallel relation.

The noses 22 and 23 of the jaws 19 and 20 are offset so that the axis of rotation 21 of each jaw is at a relatively steep angle, such as 45 degrees, intersecting the tip ends 24 of the jaw and preventing rotation of the jaws when, for example, the tip ends only engage the stump or root of a tooth to be extracted. In other words, squeezing the handles 14 and 15 will so swing the arms 17 and 18 and the jaws 19 and 20 carried by these arms so that gripping pressure will be exerted at the tip 24 of the jaws and the jaws will not rotate unless they also engage the side walls of a tooth inwardly from their tip ends. The noses 22 and 23 of the jaws extend forwardly at an angle α from the axis of rotation 21. The angle α is about 45 degrees.

In the use of the forceps 11, the tooth 12 to be extracted is grasped with the mouth 13 of the forceps and upon squeezing of the handles 14 and 15, the noses 22 and 23 of the jaws 19 and 20 will contact the parts of the tooth crown which project from the gum line. This will cause the jaws to rotate about their axes 21 and automatically adjust themselves to the conicity of the tooth. This adaptation of the jaws to the tooth is effected automatically to accomodate short or long crowns and crowns having conical contours which vary greatly in taper. The loading forces on the tooth 12 are transferred essentially from the tip 24 of each jaw which will be positioned close to the root of the tooth along a gripping area extending outwardly from the root to distribute the gripping forces uniformly and prevent high unit loading which could fracture the crown.

Figure 4:
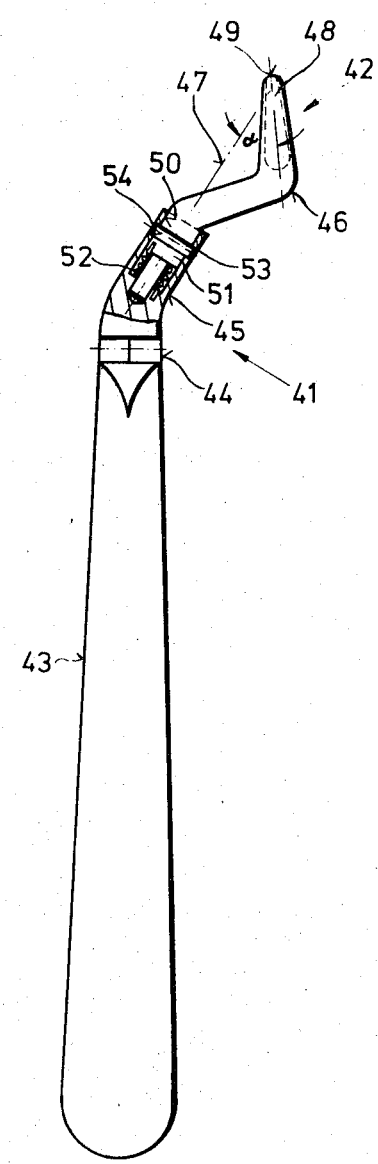
FIG. 4 is a view similar to FIG. 1 but showing a tooth forceps of this invention adapted for the extraction of teeth in the upper jaw.

The tooth forceps 41 of FIG. 4 adapted for the extraction of teeth from the upper jaw differs from the tooth forceps 11 of FIGS. 1 to 3 for the extraction of teeth from the lower jaw in the reverse positioning of the jaws in the sockets. Thus, as shown in FIG. 1, the jaw extends at an angle of about 45 degrees forwardly from the handle grip while, as shown in FIG. 4, the jaw is rotated 180 degrees and extends generally at an angle of about 45 degrees rearwardly from the handle grip. The body or handle grips of each forceps 11 and 43 can be identical.

The forceps 41 of FIG. 4 has a mouth 42 for surrounding the tooth to be extracted, handles 43, a pivot 44, angled arms 45 beyond the pivot 44 on the handles 43 and jaws 46 swivelly mounted in the arms 45 on an axis of rotation 47. The jaws such as 46 can be the same as the jaws 19 and 20 of the forceps 11 but rotated 180 degrees from their positions in the forceps 11 so that their front ends or noses such as 48 are inclined rearwardly instead of forwardly from the axis of rotation 47. The nose 48 has a tip end 49 to contact the corresponding tip end of the opposite jaw 46 (not shown) in the same manner described in connection with FIGS. 1 to 3.

The forceps 41 has a recess 50 in each arm 45 thereof corresponding with the recesses 25 of the forceps 11 receiving the cylindrical pin end 51 of the jaw 46 and biased by a torsion spring 52. A pin 53 secures the jaw 46 in the recess 50 and guide grooves 54 in the arm 45 limit the rotation of the jaw 46 in the arm as defined in connection with the forceps 11.

It will be understood that the forceps 41 are used and function in the same manner as the forceps 11, the jaws being reversed to better accommodate the extraction of teeth in the lower jaw.

Figure 5:
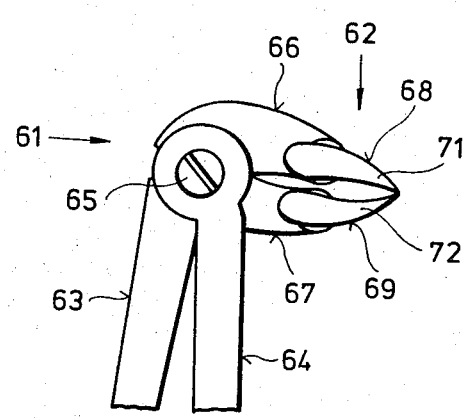
FIG. 5 is a fragmentary side elevational view of a tooth forceps of this invention adapted for extraction of lower incisors and pre-molars.
Figure 6:
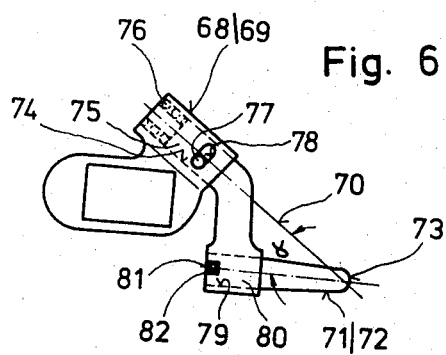
FIG. 6 is a top plan view of the tooth forceps of FIG. 5.

The tooth forceps 61 illustrated in FIGS. 5 and 6 have a mouth 62 for encircling an incisor or pre-molar tooth under control of handles or grips 63 and 64 pivoted on a pin 65 and having arms 66 and 67 projecting forwardly at about a 90° angle to the handles. The arms 66 and 67 carry swivelly mounted jaws 68 and 69 respectively, which, as shown in FIG. 6, extend laterally from the arm and rotate on an axis of rotation 70. The tip ends of the jaws 68 and 69 carry front parts or noses 71 and 72 at an angle α from the axis of rotation 70 and as illustrated, extend at about 90 degrees from the jaws. The axis of rotation 70 intersects the tip end 73 of each jaw as shown.

The arms 66 and 67 each have a cylindrical recess 74 swivelly mounting the cylindrical 75 of each jaw 68 and 69. A torsion spring 76 rotates the jaws to bring the tip ends 73 thereof into contact. A pin 77 anchors each jaw in its arm and the ends of the pin extend into grooves 78 which, as explained above, limit the rotation of the jaws.

As best shown in FIG. 6, the noses 71 and 72 of the jaws are mounted in cylindrical bores or recesses 79 in the ends of the jaw with each nose 71 and 72 having a cylindrical end 80 seated in the recess and held therein by a pin 81 projecting into a groove in the jaw thereby accommodating rotation of the nose relative to the jaw. A double swivel mounting is thus provided so that the noses 71 and 72 can accommodate or equalize the rotation of the jaws 68 and 69.

The forceps of this invention can be made from drop forged metal handle and arm parts with bores and holes that can interchangeably receive the different shaped jaw portions. The jaws are arranged to have tip ends which will engage a tooth to be extracted as close as possible to the root but these jaws can rotate through an angle of about 20° or more so that their nose portions will automatically align themselves with the side walls of the tooth crown thereby accommodating teeth throughout a wide range of conicity. The torsion springs urge the jaws to a position of the lowest conicity of a tooth but, of course, are stressed to accommodate rotation of the jaws so that their noses will fit the tooth. A single forceps body of this invention can accommodate reverse mounting of the tooth gripping jaws by rotating the same 180° as illustrated in FIGS. 1 and 4, thereby adapting the forceps to upper and lower tooth extraction.

From the above descriptions it will therefore be understood that this invention now provides a universal type tooth forceps which will accommodate itself automatically to the contour of a tooth to be extracted and which is easily adjusted for upper and lower jaw extractions.

I claim as my invention:

1. A forceps comprising a pair of pivotally connected handles, an integral arm on each handle swingable about the pivot to move toward each other as the handles are squeezed toward each other, a jaw member rotatably mounted in each arm and extending therefrom, a gripping nose on the end of each jaw terminating in a tip end and said jaws rotating to follow the contour of a member gripped by said tip ends to distribute the gripping load along the length of said noses and thereby reduce the unit loading.

2. The forceps of claim 1 wherein said arms extend at an angle to the handles and said jaws are bent away from the axis of rotation provided by the arms with the noses on the jaws being reversely bent to position the tip ends on the axis of rotation.

3. The forceps of claim 1 including spring means rotating the jaws to bring the tip ends thereof into contact.

4. The forceps of claim 1 wherein each jaw has a pin end rotatably mounted in an end of an arm, has an angled leg portion extending away from the axis of rotation thereof and the nose portion is angled back to the axis of rotation.

5. The forceps of claim 1 wherein the arms are bent at an angle of about 45° from the handles and the jaws rotatably carried by the arms are generally S-shaped.

6. The forceps of claim 1 wherein a pin carried by each jaw extends into grooves provided in each arm to mount the jaw for limited rotation in the arm and the jaw can be mounted in two positions 180° apart.

7. A tooth forceps automatically adapting its gripping jaws to the contour of a tooth to be extracted which comprises a pair of body members pivoted near one end providing gripping handles on one side of the pivot and angled arms on the other side of the pivot, tooth encircling jaws rotatably mounted in and projecting from the ends of each arm manipulated by said handles into gripping engagement with a tooth to be extracted and noses on the ends of said jaws adapted to engage the side walls of a tooth to be extracted and rotate the jaws into alignment with the tooth to distribute the gripping pressure along the length of the tooth crown.

8. The tooth forceps of claim 7 wherein the jaws are mountable in positions 180° apart in the arms to accommodate the extraction of teeth from both the lower and the upper jaw.

9. The tooth forceps of claim 7 including a torsion spring rotating the jaws to bring the top ends thereof into contact.

10. The tooth forceps of claim 7 wherein each jaw has a nose offset at an angle of about 45° therefrom.

11. The tooth forceps of claim 7 wherein the arms extend at an angle of about 45° from the handles.

12. The tooth forceps of claim 7 wherein the arms extend at an angle of about 90° from the handles.

13. The tooth forceps of claim 7 wherein each jaw has a nose with an axis of about 45° from the axis of rotation of the jaw.

14. The tooth forceps of claim 7 wherein each jaw is generally S-shaped.

* * * * *